(12) United States Patent
Korsten et al.

(10) Patent No.: US 7,327,052 B2
(45) Date of Patent: Feb. 5, 2008

(54) MODULAR CONNECTING SYSTEM FOR PROTECTING AN ELECTRICAL LOAD IN A BUS SYSTEM

(75) Inventors: Klaus Korsten, Steinen (CH); Christian Tepper, Weil am Rhein (DE); Matthias Müller, Lage (DE); Michael Buschkamp, Lage (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 238 days.

(21) Appl. No.: 11/190,171

(22) Filed: Jul. 26, 2005

(65) Prior Publication Data

US 2006/0193094 A1    Aug. 31, 2006

(30) Foreign Application Priority Data

Aug. 4, 2004    (DE) ...................... 10 2004 037 924

(51) Int. Cl.
H01H 47/00 (2006.01)
H01H 83/00 (2006.01)
H02B 1/24 (2006.01)
H02J 7/00 (2006.01)

(52) U.S. Cl. ..................................... 307/125
(58) Field of Classification Search ................ 307/125; 361/62

See application file for complete search history.

(56) References Cited

U.S. PATENT DOCUMENTS 6,667,461 B1 * 12/2003 Cogan ......................... 219/209
7,177,125 B2 * 2/2007 Lazarovich et al. .......... 361/42

FOREIGN PATENT DOCUMENTS

| DE | 41 28 679 C1 | 8/1992 |
| DE | 197 82 052 T1 | 4/1998 |
| DE | 299 08 825 U1 | 2/2000 |
| DE | 199 23 569 A1 | 11/2000 |
| DE | 100 47 114 C1 | 5/2002 |
| EP | 1 190 403 B1 | 1/2001 |
| WO | WO 00/62394 | 10/2000 |

* cited by examiner

*Primary Examiner*—Michael Sherry
*Assistant Examiner*—Carlos Amaya
(74) *Attorney, Agent, or Firm*—Lawrence E. Laubscher, Sr.; Lawrence E. Laubscher, Jr.

(57) ABSTRACT

An electrical distribution system includes a plurality of separate consumer modules for supplying power to a plurality of consumer loads, respectively. Each of the consumer modules includes an overload fault detection device for automatically interrupting the supply of power to a given consumer load upon the detection of a fault therein by an overload protection arrangement. When the voltage drop across a measuring resistor exceeds a given threshold value, a non-conducting transistor becomes conductive, thereby opening a gate circuit to disconnect the consumer load from its power supply. Resistors of varying resistance values may be selected manually or by remote control to correspond with the demand requirements of the consumer loads.

9 Claims, 2 Drawing Sheets

MODULAR CONNECTING SYSTEM FOR PROTECTING AN ELECTRICAL LOAD IN A BUS SYSTEM

BACKGROUND OF THE INVENTION

1. Field of the Invention

An electrical distribution system includes a plurality of separate consumer modules for supplying power to a plurality of consumer loads, respectively. Each of the consumer modules includes an overload fault detection device for automatically interrupting the supply of power to a given consumer load upon the detection of a fault therein by an overload protection arrangement. When the voltage drop across a measuring resistor exceeds a given threshold value, a non-conducting transistor becomes conductive, thereby opening a gate circuit to disconnect the consumer load from its power supply. To customize the consumer modules, resistors of varying resistance values may be selected manually or by remote control to correspond with the power demand requirements of the associated consumer load.

2. Description of the Related Art

In a modular electrical power distribution bus system commonly used in automation technology, several consumers are usually connected together via a connection device to define a specific subdistribution segment which is connected by a segment coupler to the main power supply bus which in turn is connected with and controlled by a control station having a master control panel. The bus system can be formed of conductor line or wireless connections, where, in the latter case, supply voltages are delivered to the connecting devices not from the segment coupler but, for instance, from another supply source, wherein control of connecting devices I effected by wireless means, for example, via radio.

In the segment coupling device there is normally provided a first current limiter device for the entire segment. If a defect occurs in the segment, for example, a short circuit, then the entire segment is separated from the bus by the segment coupling device, whereby the supply of power to the consumers of that segment is limited.

In this way, the entire segment is out of action, therefore, it is also known that one can associate an additional separate current limiter device in each case for the individual connecting devices. It has be discovered that a major disadvantage to this prior arrangement is that upon the response of this device to a fault condition, the other consumers of the segment are also disconnected, and it is not possible then quickly and simply identify the faulty consumer among the large number of consumers.

The German patent No. DE 100 47 114 C1 describes a protective circuit for voltage limitation for a device that is to be protected in a separable manner by means of a circuit element. That is done by a microdevice in the form of an electronic switch or, under certain circumstances, by a relay with a control circuit having a voltage sensor control device. The switch separates the element that is to be protected galvanically. As another example, the International Publication No. WO 00/62394 describes a safety barrier for the purpose of limiting the current and the voltage. Current limitations can be adjusted manually at the location of the particular connecting device.

The present invention was developed to provide an improved fault protection system in which the recognition and processing of failure situations will be greatly simplified.

BRIEF SUMMARY OF THE INVENTION

Accordingly, a primary object of the present invention is to provide an electrical power distribution system including a distribution segment for supplying power to a number of consumer loads via consumer modules that are associated with the consumer loads, respectively, each of the consumer modules including current limiting means operable upon the occurrence of a fault in a given consumer load to disconnect that load from the power supply. The current limiting means also activates a display light to provide a visual indication of that one of the consumer modules of the segment has been operated to disconnect the associated consumer load, and transmits a fault signal to the main control panel via consumer module monitoring means.

According to a more specific object of the invention, each consumer module includes selector switch means operable to insert in the circuit one of a number of resistors having different resistance values, thereby to adjust the threshold voltage of the consumer module circuit to correspond with the power demands of a given consumer load means. The selector switch means can be operated by remote control from the main control panel, or manually at the consumer load location.

According to another object of the invention, the monitoring means for each consumer module supplies to the main control panel information about the operation of that module, such as the voltage input or output of that circuit.

According to a more specific object, the connecting device is provided with a data transmission device that is operated, via the bus system, with a main control panel that is series connected in front of the segment coupler, in other words, a control stand, and is designed at least for the transmission of a state information concerning the state of the current limiter device to the main control panel. The connecting device or its transmission device can be connected with the control panel and/or the segment coupler via hard wired lines or in a wireless manner.

The term "segment coupler"—a connecting device—is not to be construed here in any restrictive manner, in the usual terminology used with professional bus standards. Instead, by this is also meant a so-called "link device" in the Field Bus Foundation terminology.

The present invention makes it possible on the control station to indicate at least one failure state so that the faulty consumer can be easily identified by means of remote recognition. In that way one can identify a failure in a simple manner and one can avoid having to shut the entire system down.

Preferably, the connecting device itself furthermore has, for example, an optical display unit that is used at least to display an overcurrent situation on the connecting device.

According to an advantageous development, the data transmission device is connected with a current and/or voltage sensor for the purpose of scanning a current and/or voltage state in the connection device, and includes a data generation unit for the generation of transmission data based on measurement data from the current sensor and/or the voltage sensor for transmission to the main control panel, so that one can also use the locally prevailing current and/or voltage states for advantageous remote diagnosis. By virtue of the transmission of these data regarding the faulty consumer, one can prepare and implement a particularly good remote diagnosis and, of course, specific defect correction.

In another preferred embodiment in the invention at hand, resistances—in operating connection with the current sensor—are so designed that they can be connected into a current path of the consumer. This facilitates advantageous adaptation to different consumers and thus broadens the range of employment of the invention-based connection device, where it is preferred that the resistance be made by means of an adjustable contact that can be connected into the current path of the consumer.

In another design, the adjustable contact is made so that it can be adjusted manually and/or from the control unit via an adjusting device of the data transmission device. That facilitates advantageous preventive care and thus an increase in the operational safety of the system, into which the connecting device is built, and early recognition of faulty consumers is thus also possible.

The segment coupling means includes segment current limiting means 20 as is known in the art, and has an input that is connected by conductors 6 with the main bus bar means 5.

Another development of the invention-based connecting device provides the following: the circuit element is a part of the current limiter device for the interruption of the current of the consumer and/or for the limitation of the current of the consumer.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

Figure 1:
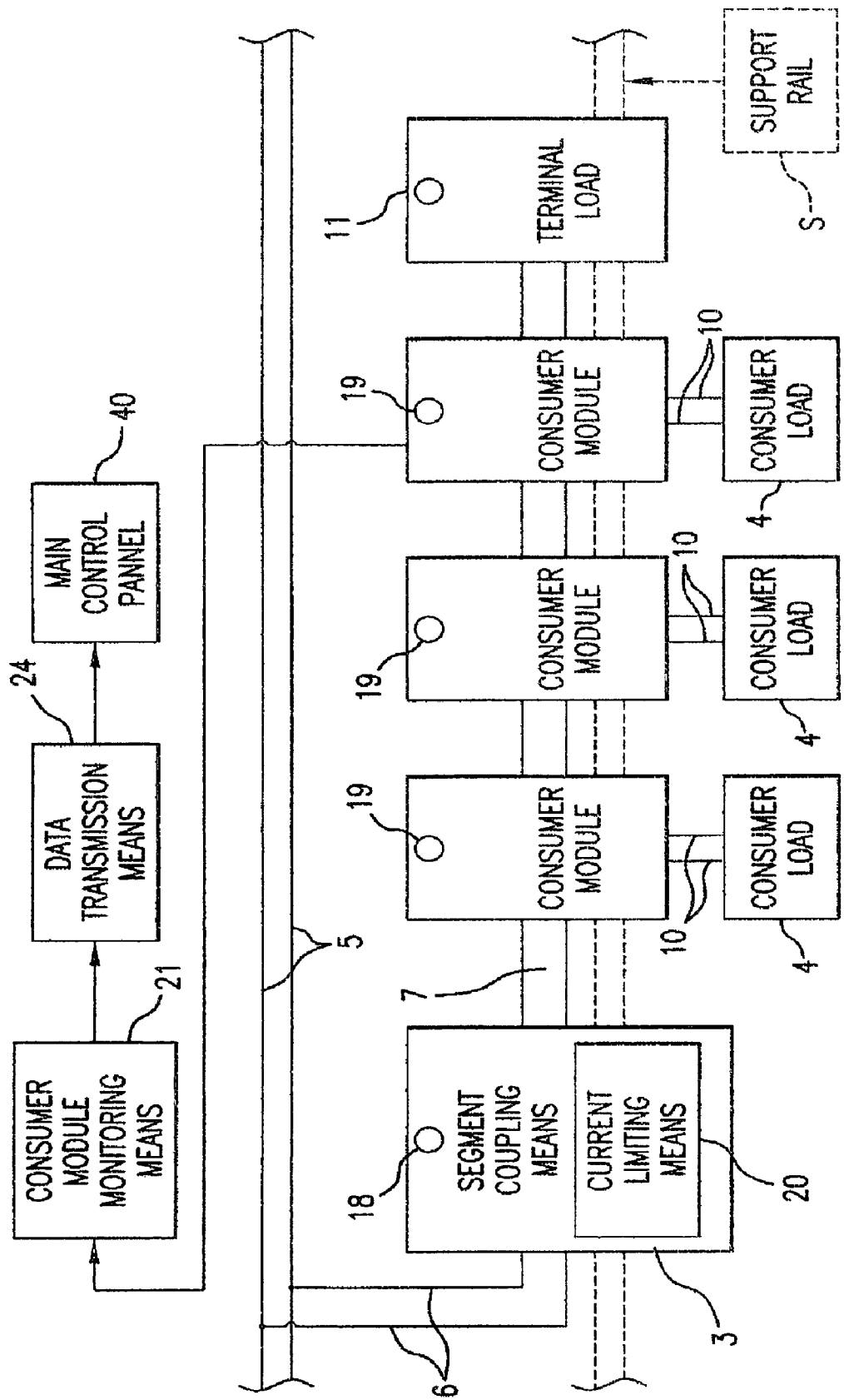
FIG. 1 is a block diagram of the entire segment distribution system of the present invention.

Referring first more particularly to FIG. 1, the electrical power distribution system of for an automated building or the like includes main bus bar means 5 that supplies power under the control of main control panel means 40 to a number of consumer loads 4 grouped together to define a subdistribution segment 2. According to the characterizing feature of the invention, in each segment, a plurality of separate consumer modules 1 are provided having outputs connected by conductors 10 with the consumer loads 4, respectively, and inputs that are connected between a terminal load 11 and a segment coupling means 3 by segment bus bar means 7. Monitoring means 21 supply information about the individual circuit modules via data transmission means 24 to the main control panel 40. The main control panel 40 then sends control signals back to the various consumer modules 1. The segment coupling means 3 an input that is connected by conductors 6 with the main bus bar means 5, and includes indicator light means 18 and current limiting means 20.

Figure 2:
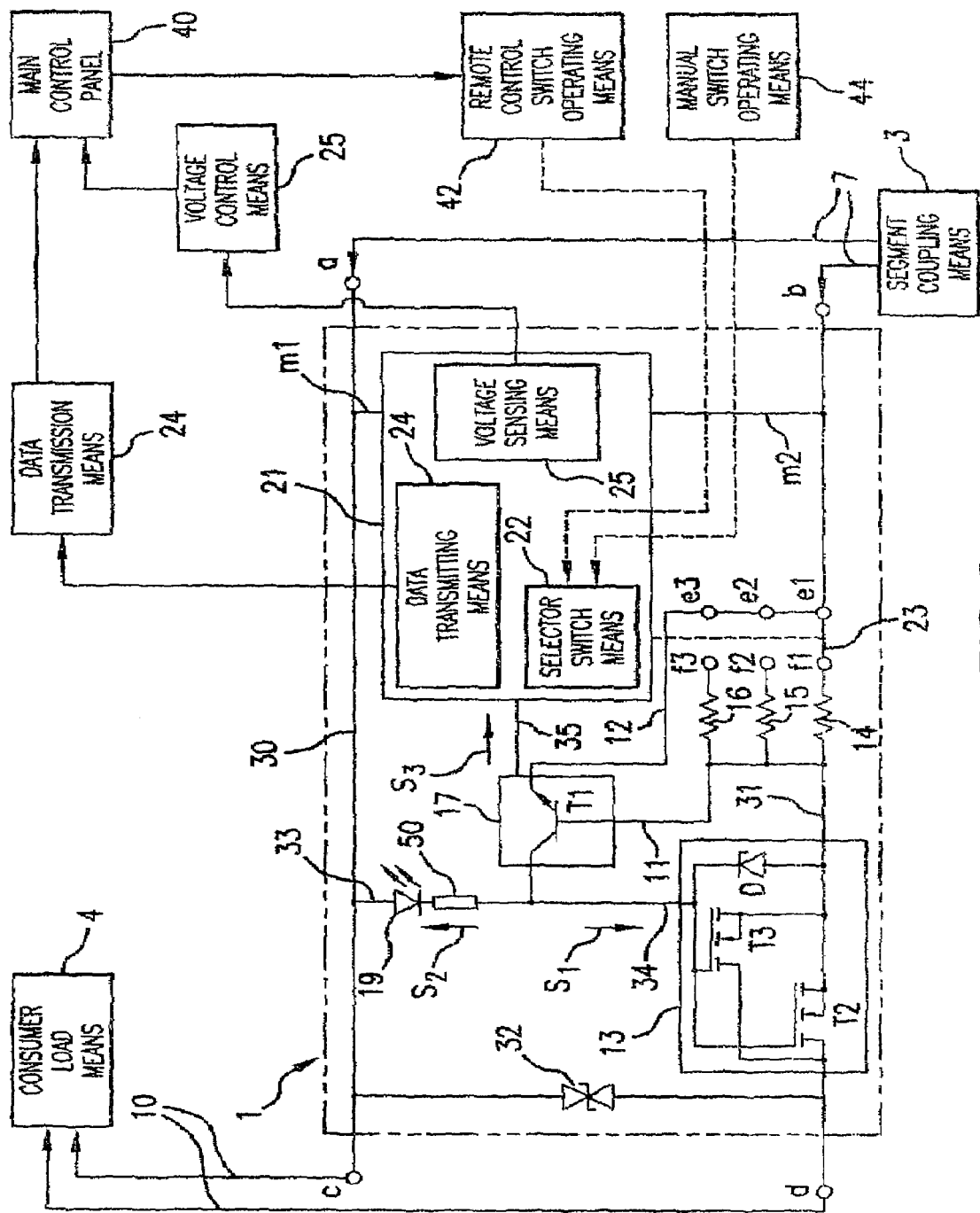
FIG. 2 is a detailed circuit diagram of one of the consumer modules of FIG. 1.

Referring now to FIG. 2, each consumer module includes a circuit having a pair of input terminals a,b connected with the segment coupling means 3 via the segment bus means 7, and a pair of output terminals c,d connected with the associated consumer load via the consumer connecting lines 10. First input and output terminals a and c are directly connected by conductor 30, and second input and output terminals b and d are connected by the series path including the movable contact 23 of selector switch means 22, measuring resistor 14, and normally closed gate circuit means 13. Current limiting means 17 are provided including a normally non-conductive transistor T1 having a base and emitter electrode circuit connected by conductors 11 and 12 across the measuring resistor 14 and movable contact 23 of the selector switch means 22. The collector electrode of transistor T1 is connected by conductor 34 with the normally conductive gate means 13, and with the circuit conductor 30 by conductor 33 including the normally de-energized light-emitting-diode indicating means 19 and the resistor 50. The gate means 13 comprises a pair of field effect transistors T2 and T3 having gate electrodes which are connected together and with the input terminal b via the second circuit conductor 31, and drain and source electrodes connected with output circuit terminal d. Protective diode D is connected across the field effect transistors between conductor 34 and the second circuit conductor 31.

In accordance with an important feature of the invention, there are provided a plurality of measuring resistors 14, 15, 16 that are selectively connected in series in the second circuit conductor 31 by the selection switch means 22. As will be described below, these measuring resistors have different resistance values corresponding with the load demands of the associated consumer load means 4. Thus, when movable switch contact is in engagement with stationary switch contacts f1 and e1, f2 and e2, and f3 and e3, the resistors 14, 15 and 16 are connected in series in the second circuit conductor, respectively.

In accordance with another important feature of the invention, monitoring means 21 are provided for transmitting to the main control panel 40 separate information about the state of operation of each of the consumer modules, respectively. Fault operation information is transmitted from transistor T1 via data transmitting means 24, and information regarding the consumer module circuit input or output voltages is transmitted by voltage sensing means 25 connected by conductors m1 and m2 across the input or output terminals of the circuit.

In operation, upon the occurrence of an overload fault or short circuit in a given consumer load means 4, the variation in the voltage drop across the measuring resistor 14 in the associated consumer module 1 is sensed by the emitter to base path of the transistor T1, whereupon the transistor is switched from its non-conductive to its conductive condition. A first display signal $s_1$ is sent to the gate means 13 via conductor 34, whereupon the gate means is operated to an open condition to disconnect the user load means 4 from the power supply bus 5. A second display signal $s_2$ is sent to activate the LED 19, thereby to indicate that one of the load means 4 of the segment 2 that has experienced a fault. A third fault signal $s_3$ is supplied to the monitoring means 21 via conductor 35, whereupon a corresponding signal is transmitted to the main control panel 40 by the data transmission means 24. This data transmission may be effected through a hard wired system, or by wireless transmission. Voltage information regarding the operation of the consumer module circuit 1 is transmitted by voltage sensor 25 to the main control panel.

In the event that the measuring resistance is to be varied to correspond with the load demands of the consumer load means 4. the selector switch 22 is operated to insert the appropriate one of the resistors 14, 15 or 16 in series in the conductor 31, thereby to adjust the threshold potential of the transistor T1. The selector switch 22 can be operated manually by the manual switch operating means 44, or by remote control from the main control panel 40 by the remote control switch operating means 42.

It is apparent that the threshold voltage value of transistor T1 could be compared with various other threshold values in order to determine various operating conditions or defects in the consumer load means 4. Furthermore, a so-called ex-protection Exi barrier between the segment coupling means 3 and the consumer modules 1, whereby this barrier separates the explosion shielded area (EXE) from the so-called inherently safe explosion shielded area (Exi). This area arrangement of subdivision is known in the art, wherein energy is transmitted as well as data via that barrier.

According to another feature of the invention as shown in FIG. 1, the various components of a distribution segment 2 may be mounted on a common support rail S at a distribution station, as is known in the art.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. An electrical power distribution system for supplying electrical power to a plurality of consumer loads (4), comprising:
   (a) main power supply bus means (5) for supplying electrical power from a source thereof;
   (b) a group of consumer distribution modules (1) associated with a plurality of consumer loads, respectively; and
   (c) segment distribution means (3) connecting said group of consumer distribution modules with said main bus means, said segment distribution means including:
      (1) segment coupling means having input terminals connected with said main power supply bus means, said segment coupling means also including output terminals; and
      (2) segment bus means (7) connecting said consumer modules with said segment coupling means output terminals; and
   (d) each of said customer distribution modules including:
      (1) a consumer module circuit having a pair of input terminals (a,b) connected with said segment bus means, and a pair of output terminals (c,d) connected with the associated consumer load means;
      (2) first conductor means (30) connecting a first one of said input terminals (a) with a first one of said output terminals (b);
      (3) second conductor means including normally closed gate means (13) connecting a second one of said input terminals (b) with a second one of said output terminals (d); and
      (4) current limiting means (17) responsive to a fault in the supply of power to said consumer load means for opening said gate means, comprising:
         (a) resistor means (14,15,16) connected in series with said gate means in said second connecting means; and
         (b) voltage responsive means (T1) responsive to the potential drop across said resistor means for opening said gate circuit means when said potential drop exceeds a given threshold value.

2. An electrical power distribution system as defined in claim 1, and further including:
   (e) main control panel means (40) for controlling the operation of the consumer load means; and
   (f) monitoring means (21) for transmitting information regarding the state of operation of said consumer module to said main control panel means.

3. An electrical power distribution system as defined in claim 2, wherein said resistor means includes a plurality resistors (14,15,16) having different resistance values, respectively, and selector switch means (23) for selecting a desired resistance in accordance with the power requirement demands of the associated consumer load means.

4. An electric power distribution system as defined in claim 3, and further including remote control means (42) operable by said monitoring means for operating said selector switch means.

5. An electrical power distribution system as defined in claim 3, and further including manual control means (44) for operating said selector switch means.

6. An electrical power distribution system as defined in claim 2, wherein said voltage responsive means includes a transistor (T1) having base, emitted and emitter electrodes, said base and emitter electrodes being connected across said resistor means, said transistor being operable from a normally non-conducting condition to a conducting condition when the potential drop across said resistor means exceeds a given value upon the occurrence of a fault in the associated consumer load.

7. An electrical power distribution system as defined in claim 6, wherein said gate means includes normally closed field effect transistor means (T2, T3) connected in series between said second circuit terminals, said field effect transistor means being operable by said transistor from a normally closed condition to an open condition, thereby to disconnect the supply of electrical power to the consumer load means.

8. An electrical power distribution system as defined in claim 2, and further including indicator means (19) operable from an inactive condition to an active condition when said measured potential drop across said resistor means exceeds said threshold value, thereby to visually indicate the state of operation of said consumer module circuit.

9. An electrical power distribution system as defined in claim 2, wherein said monitoring means includes voltage sensing means (25) for measuring at least one of the input and output potentials of said consumer module circuit.

* * * * *